United States Patent
Rife et al.

(10) Patent No.: US 11,299,276 B2
(45) Date of Patent: Apr. 12, 2022

(54) SEAT SYSTEM WITH STOWABLE TRAY

(71) Applicant: HAECO Americas, LLC, Greensboro, NC (US)

(72) Inventors: Mitchell Rife, Greensboro, NC (US); John Williamson, Greensboro, NC (US)

(73) Assignee: HAECO Americas, LLC, Greensboro, NC (US)

( * ) Notice: Subject to any disclaimer, the term of this patent is extended or adjusted under 35 U.S.C. 154(b) by 36 days.

(21) Appl. No.: 16/500,148

(22) PCT Filed: Mar. 26, 2018

(86) PCT No.: PCT/US2018/024295
§ 371 (c)(1),
(2) Date: Dec. 13, 2019

(87) PCT Pub. No.: WO2018/187070
PCT Pub. Date: Oct. 11, 2018

(65) Prior Publication Data
US 2021/0101683 A1 Apr. 8, 2021

Related U.S. Application Data

(60) Provisional application No. 62/481,343, filed on Apr. 4, 2017.

(51) Int. Cl.
*A47C 7/70* (2006.01)
*B64D 11/06* (2006.01)
(Continued)

(52) U.S. Cl.
CPC .... *B64D 11/0638* (2014.12); *B64D 11/00151* (2014.12); *A47C 7/70* (2013.01); *B60N 2/002* (2013.01)

(58) Field of Classification Search
CPC .......... B64D 11/0638; B64D 11/00151; B64D 11/065; A47C 7/622; A47C 7/624;
(Continued)

(56) References Cited

U.S. PATENT DOCUMENTS 3,583,760 A * 6/1971 McGregor ......... B64D 11/0627
297/145
4,455,008 A * 6/1984 MacKew ................. A47C 7/70
248/447.1
(Continued)

*Primary Examiner* — Kyle J. Walraed-Sullivan
(74) *Attorney, Agent, or Firm* — MacCord Mason PLLC

(57) ABSTRACT

A seat system for a passenger aircraft. The seat system includes at least one passenger seat and a stowable tray installed onto or adjacent to the passenger seat. The stowable tray includes a tray plate adapted to support one or more items; a support arm attached to the tray plate adapted to move the tray plate between a stowable position and a presentation position; and a friction hinge attaching the tray plate to the support arm and adapted to adjust the tray plate between the presentation position and a tray position, wherein the tray plate is adapted to support a personal electronic device while in the presentation position and adapted to support one or more cocktail items while in the tray position. A second stowable tray may also be attached to the passenger seat.

18 Claims, 6 Drawing Sheets

(51) Int. Cl.
B64D 11/00 (2006.01)
B60N 2/00 (2006.01)

(58) Field of Classification Search
CPC .......... A47C 7/70; B60N 3/002; B60N 3/004; B60N 3/007
USPC .......................................... 297/144, 145, 146
See application file for complete search history.

(56) References Cited

U.S. PATENT DOCUMENTS

| | | | | |
|---|---|---|---|---|
| 4,848,833 A | * | 7/1989 | Grail | A61G 5/10 297/162 |
| 5,562,049 A | * | 10/1996 | Hoffman | A47B 17/065 108/94 |
| 5,765,911 A | * | 6/1998 | Sorenson | A47C 7/70 297/173 |
| 8,474,384 B2 | * | 7/2013 | Sundarrao | A47B 3/00 108/42 |
| 8,585,146 B1 | * | 11/2013 | Giasson | B64D 11/0644 297/344.1 |
| 2008/0164729 A1 | | 7/2008 | Cavanaugh | 297/162 |
| 2008/0302938 A1 | * | 12/2008 | Goodwin | A47C 7/70 248/288.51 |
| 2010/0171350 A1 | | 7/2010 | Large et al. | 297/217.3 |
| 2012/0272548 A1 | | 11/2012 | Downard | 36/107 |
| 2012/0292973 A1 | | 11/2012 | Westerink et al. | 297/391 |
| 2013/0076082 A1 | * | 3/2013 | Herault | B64D 11/0638 297/173 |
| 2013/0093220 A1 | | 4/2013 | Pajic | 297/163 |
| 2013/0264298 A1 | | 10/2013 | Shih et al. | 211/26 |
| 2015/0329062 A1 | * | 11/2015 | Ackeret | B60N 3/002 248/220.22 |
| 2016/0039524 A1 | * | 2/2016 | Zheng | B64D 11/06 297/173 |
| 2016/0249073 A1 | * | 8/2016 | Margis | B64D 11/00152 |

* cited by examiner

SEAT SYSTEM WITH STOWABLE TRAY

This application claims the benefit of U.S. provisional application No. 62/481343, filed on Apr. 4, 2017, which is incorporated herein by reference in its entirety.

BACKGROUND OF THE INVENTIONS

(1) Field

The present inventions relates generally to seat systems for passenger vehicles and, more particularly, to a seat system for a passenger aircraft.

(2) Related Art

Airline passengers, especially those in first and business classes, expect a multitude of features and amenities on their seat to make their journey more enjoyable and convenient. Two examples of such amenities include the cocktail tray, for placing drinks or other small items, and the tablet holder, for mounting a tablet computer or other personal electronic devices (PED) at a comfortable height and angle for viewing. However, due to cost constraints, there is a limit to space, weight and complexity that an aircraft seat can take while enabling the airline to operate economically. Therefore, airlines are not able to pack all the features that passengers desire into the seat.

Thus, there remains a need for a new and improved seat system for a passenger aircraft having a stowable tray including a tray plate wherein the tray plate is adapted to support a personal electronic device while in the presentation position while, at the same time, is adapted to support one or more cocktail items while in the tray position.

SUMMARY OF THE INVENTIONS

The present inventions are directed to a seat system for a passenger aircraft. The seat system includes at least one passenger seat and a stowable tray installed onto or adjacent to the passenger seat. The stowable tray includes (i) a tray plate adapted to support one or more items; (ii) a support arm attached to the tray plate adapted to move the tray plate between a stowable position and a presentation position; and (iii) a friction hinge attaching the tray plate to the support arm and adapted to adjust the tray plate between the presentation position and a tray position, wherein the tray plate is adapted to support a personal electronic device while in the presentation position and adapted to support one or more cocktail items while in the tray position. A second stowable tray may also be attached to the passenger seat.

In one embodiment, the support arm includes a lower support arm and an upper support arm. The lower support arm may be pivotally mounted at or substantially near an end opposite of the tray plate. Also, the lower support arm may be pivotally mounted onto a center console installed adjacent to the passenger seat.

In one embodiment, the upper support arm rotates with respect to the lower support arm along a vertical axis. The upper support arm may rotate the tray plate between the stowable position and the presentation position.

In one embodiment, the friction hinge is installed on top of the upper support arm. A stop may be used to prevent the tray plate from tilting away beyond the tray position. Also, the stop may be adjustable. In addition, a portion of the tray plate includes a cut-out forming the stop for the friction hinge.

The stowable tray may further include a ledge adapted to receive the personal electronic device. In addition, an anti-skid material may be added covering at least a portion of the tray plate. In one embodiment, the anti-skid material is applied on the ledge of the tray plate.

The second stowable tray may be movable between a first storage position and a second deployed position. In one embodiment, the second stowable tray is installed on an armrest of the passenger seat.

The passenger seat may further include a display attached to the back of the passenger seat. In one embodiment, the display is adjoined by a seat back bezel.

The passenger seat may include a base frame, a seat component attached to the base frame and a backrest attached to the base frame adjoining the seat component. The backrest may further include a head rest. In one embodiment, the head rest is adjustable to accommodate for the height of a passenger.

The passenger seat may further include an upholstery package. In addition, the passenger seat may further includes a trim package.

Accordingly, one aspect of the present inventions is to provide a seat system for a passenger aircraft, the seat system including (a) at least one passenger seat; and (b) a stowable tray installed onto or adjacent to the passenger seat, wherein the stowable tray is adapted to be positioned between a stowable position and then into either a presentation position or a tray position.

Another aspect of the present inventions is to provide in a seat system for a passenger aircraft wherein the seat system includes at least one passenger seat having a backrest, the improvement comprising a stowable tray, the stowable tray comprising (a) a tray plate adapted to support one or more items; (b) a support arm attached to the tray plate adapted to move the tray plate between a stowable position and a presentation position; and (c) a friction hinge attaching the tray plate to the support arm and adapted to adjust the tray plate between the presentation position and a tray position, wherein the tray plate is adapted to support a personal electronic device while in the presentation position and adapted to support one or more cocktail items while in the tray position.

Still another aspect of the present inventions is to provide a seat system for a passenger aircraft, the seat system including (a) at least one passenger seat; (b) a stowable tray installed onto or adjacent to the passenger seat including (i) a tray plate adapted to support one or more items; (ii) a support arm attached to the tray plate adapted to move the tray plate between a stowable position and a presentation position; and (iii) a friction hinge attaching the tray plate to the support arm and adapted to adjust the tray plate between the presentation position and a tray position, wherein the tray plate is adapted to support a personal electronic device while in the presentation position and adapted to support one or more cocktail items while in the tray position; and (c) a second stowable tray attached to the passenger seat.

These and other aspects of the present inventions will become apparent to those skilled in the art after a reading of the following description of embodiments when considered with the drawings.

DESCRIPTION OF THE EMBODIMENTS

Figure 1:
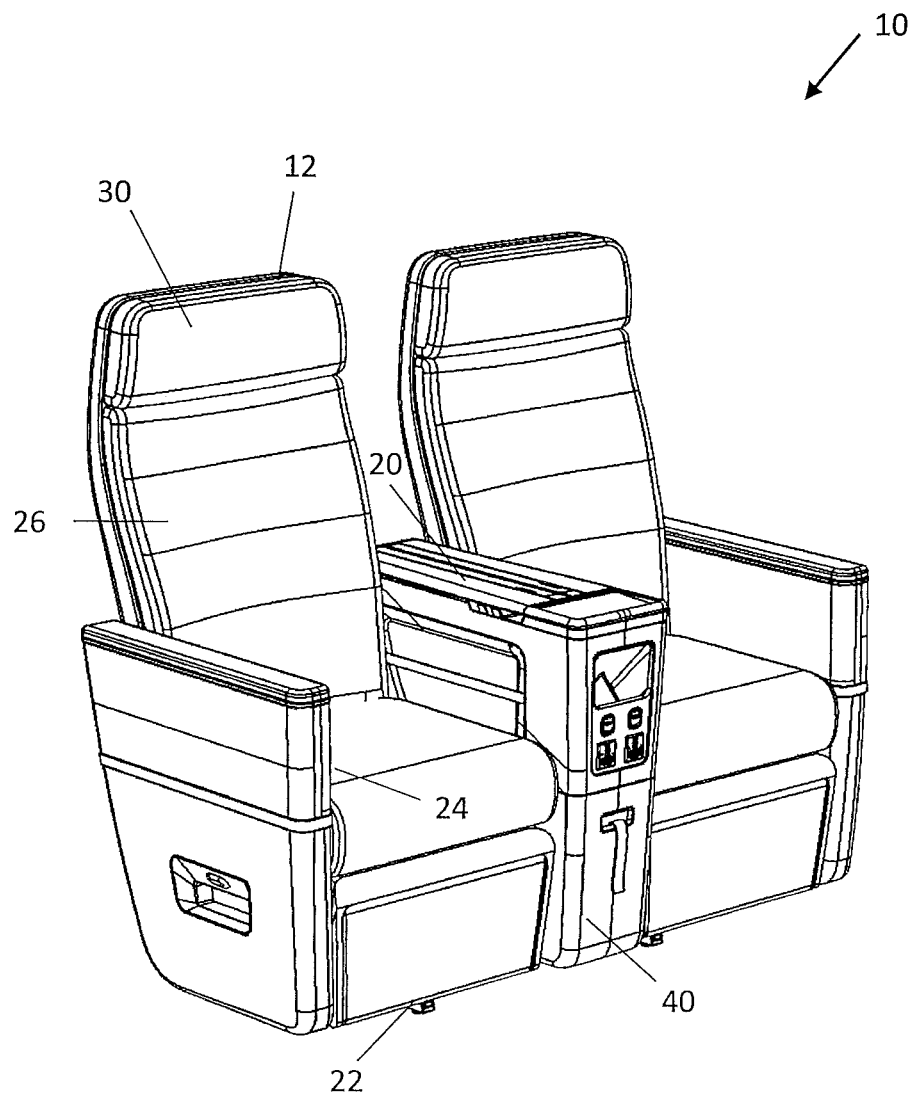
FIG. 1 is an overhead perspective view of one embodiment of a seat system constructed according to the present inventions.

In the following description, like reference characters designate like or corresponding parts throughout the several views. Also in the following description, it is to be understood that such terms as "forward," "rearward," "left," "right," "upwardly," "downwardly," and the like are words of convenience and are not to be construed as limiting terms.

Referring now to the drawings in general and FIG. 1 in particular, it will be understood that the illustrations are for the purpose of describing a preferred embodiment of the inventions and are not intended to limit the inventions thereto. As best seen in FIG. 1, a seat system, generally designated 10, is shown constructed according to the present inventions. The seat system 10 includes at least one passenger seat 12.

Each of the passenger seats 12 may include a base frame 22, a seat bottom support assembly 24 attached to a base frame and a backrest 26 attached to the base frame 22 adjoining the seat component 24. The backrest 26 may further include a headrest 30. In one embodiment headrest 30 is adjustable to accommodate the height of a passenger. A second stowable tray 20 may be attached to a center console of passenger seat 12, and may be movable between a first storage position and a second deployed position. In the storage position, as shown in FIG. 1, second stowable tray 20 remains completely concealed. In other embodiments, second stowable tray 20 may be installed on an armrest of passenger seat 12.

Figure 2:
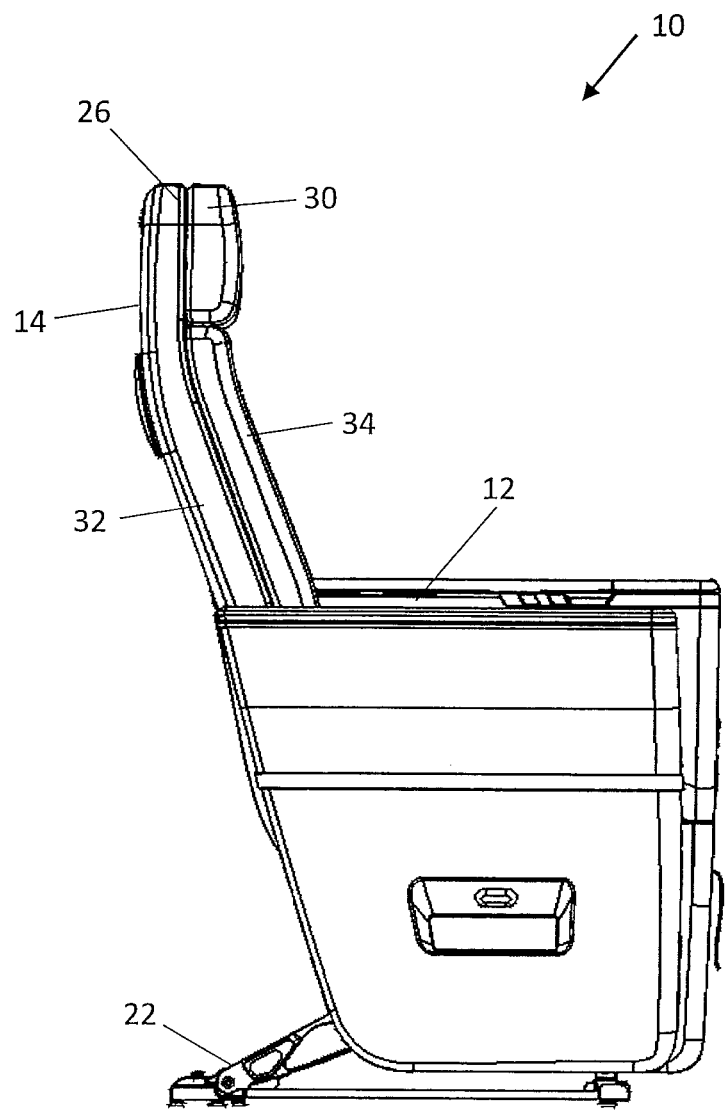
FIG. 2 is a side elevational view of the seat system shown in FIG. 1.

Turning to FIG. 2, there is shown a side view of the seat system 10 constructed according to the present inventions. A seat back bezel 14 is attached to the back of the passenger seat 12. Some embodiments may further include a display attached to the back of the passenger seat 12. The display may adjoin the seat back bezel 14. The passenger seat 12 may further include an upholstery package generally designated 32 and may also include a trim package generally designated 34.

Figure 3:
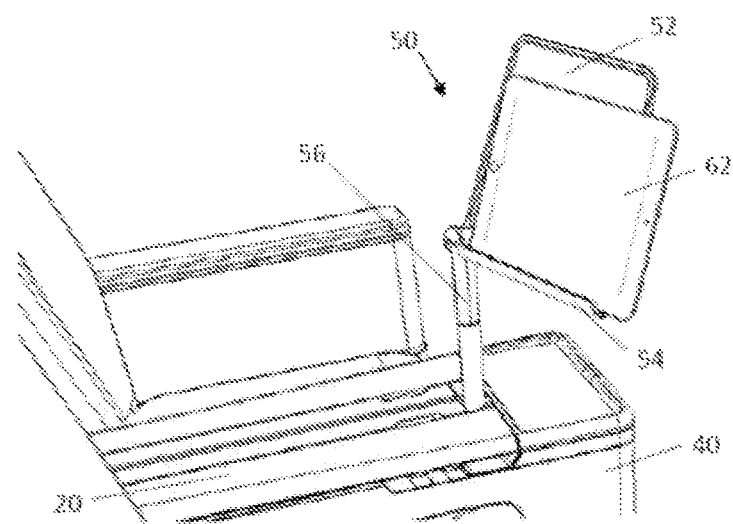
FIG. 3 is an enlarged perspective view of a stowable tray in a presentation position as constructed according to one embodiment of the present inventions.
Figure 4:
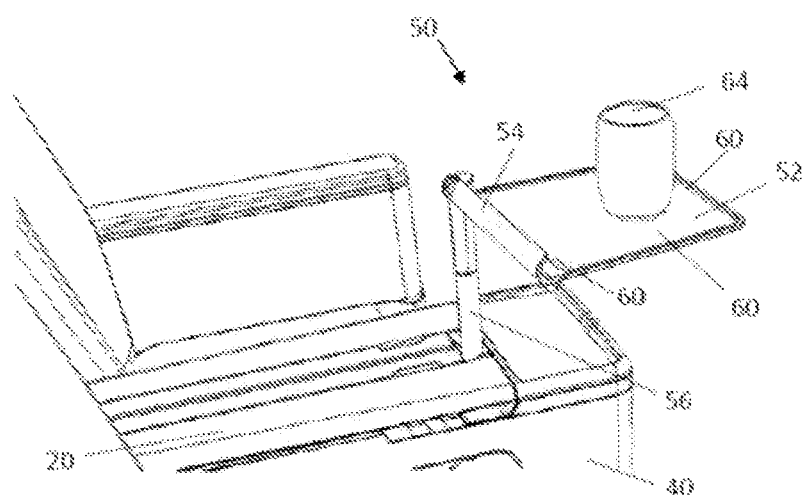
FIG. 4 is an enlarged perspective view of the stowable tray shown in FIG. 3 in a tray position.

FIGS. 3 and 4 illustrate one embodiment of a stowable tray 50. Stowable tray 50 may be installed directly onto or adjacent to passenger seat 12. As seen in FIG. 3, stowable tray 50 is installed onto a center console 40 adjacent to passenger seat 12, and includes a tray plate 52 mounted onto a support arm 56. Tray plate 52 may also include a ledge 54 for holding a personal electronic device (PED) 62. For example, tray plate 52 may comprise an aluminum sheet with a rolled edge at one end serving as the ledge 54.

When deployed, stowable tray 50 may be positioned into either a presentation position or a tray position. As seen in FIG. 3, PED 62 is placed on stowable tray 50 while in a presentation position. Examples of PEDs compatible with stowable tray 50 include tablets, phones and e-book readers. FIG. 4 depicts stowable tray 50 in a tray position adapted to support one or more cocktail items 64. Tray plate 52 may include anti-skid material 60 to provide a non-slip surface for cocktail items 64. Anti-skid material 60 may also be applied to ledge 54 to facilitate retention of PED 62.

Figure 5:
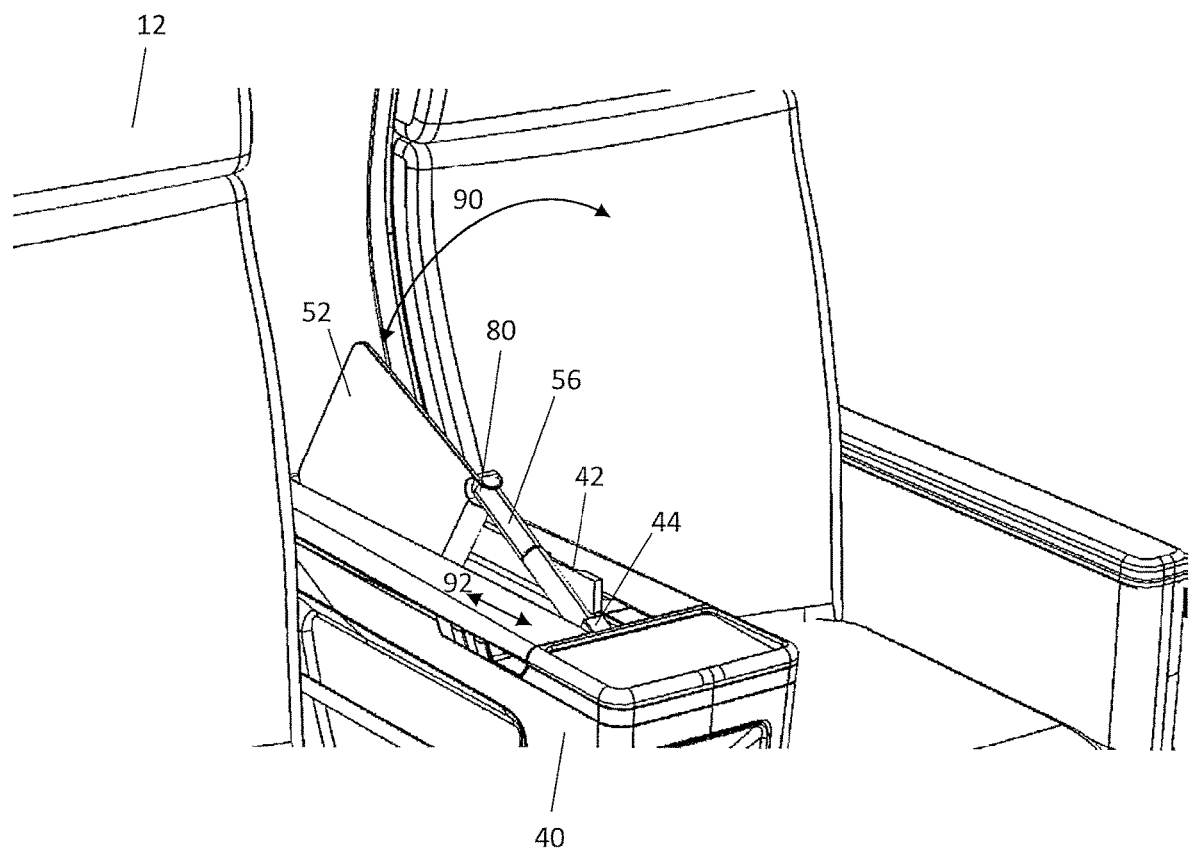
FIG. 5 is an enlarged perspective view of the embodiment shown in FIG. 3 wherein the stowable tray is pivoting from a stowed position.

FIG. 5 shows one embodiment wherein stowable tray 50 is deployed from a stowable position inside center console 40. In its stowed position, stowable tray 50 remains inside center console 40 and concealed by door 42. Support arm 56 transitions stowable tray 50 from a stowable position to a deployed position with pivot hinge 44. Pivot hinge 44 may be installed at or substantially near an end opposite of tray plate 52, and enables tray plate 52 and support arm 54 to pivot from a horizontal to a vertical position along plane 90. In some embodiments, pivot hinge 44 may be mounted onto a sliding device that allows a passenger to adjust the distance of stowable tray 50 by moving support arm 54 forward or backward along axis 92. For example, a passenger can adjust the viewing distance of the PED, or bring cocktail items closer for an easier reach.

Figure 6:
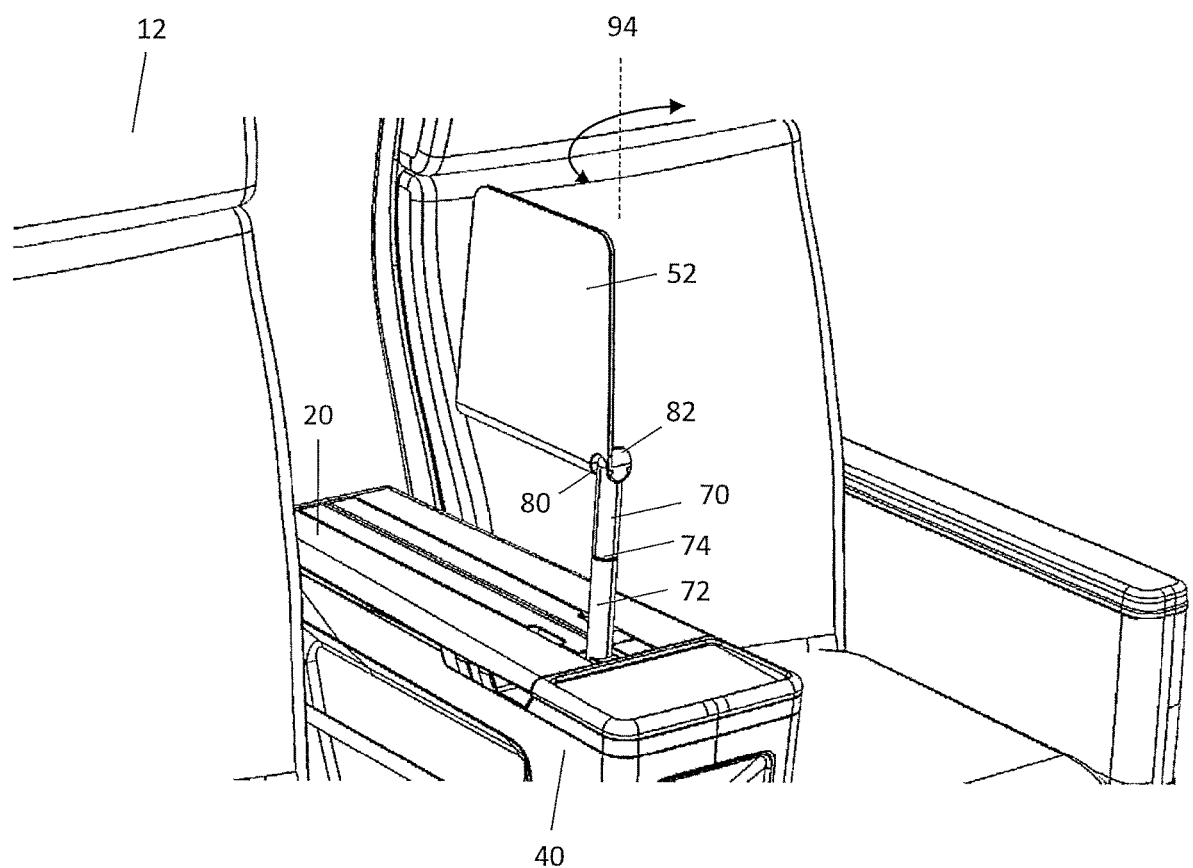
FIG. 6 is an enlarged perspective view of the embodiment shown in FIG. 3 wherein the stowable tray is rotating to a second presentation position.

Once deployed, stowable tray 50 may be placed in either a presentation position or tray position. FIG. 6 illustrates stowable tray 50 rotating from a stowable position to a presentation position. After being deployed, tray plate 52 may initially remain vertically parallel with center console 40. In one embodiment, tray plate 52 may be turned by rotating support arm 56. For example, as seen in FIG. 6, support arm 56 may comprise an upper support arm 70 and a lower support arm 72. Lower support arm 72 remains fixed as upper support arm 70 rotates along vertical axis 94 with respect to lower support arm 72 via a rotation hinge 74.

Support arm 56 may include one or more stops to prevent tray plate 52 from rotating beyond certain ranges. For example, support arm 56 may include a stop to facilitate returning tray plate 52 into a parallel position with center console 40 for storage. Support arm 56 may also include a stop to prevent tray plate 52 from turning greater than a certain angle away from the stowable position; for example, more than about 90° or more than about 180° away. Yet in other embodiments, support arm 56 may enable full 360° rotation along vertical axis 94. Other mechanisms for rotating tray plate 52 may be employed in alternative embodiments. For instance, support arm 56 may rotate in its entirety or include a hinge enabling rotation where tray plate 52 is attached.

Figure 7:
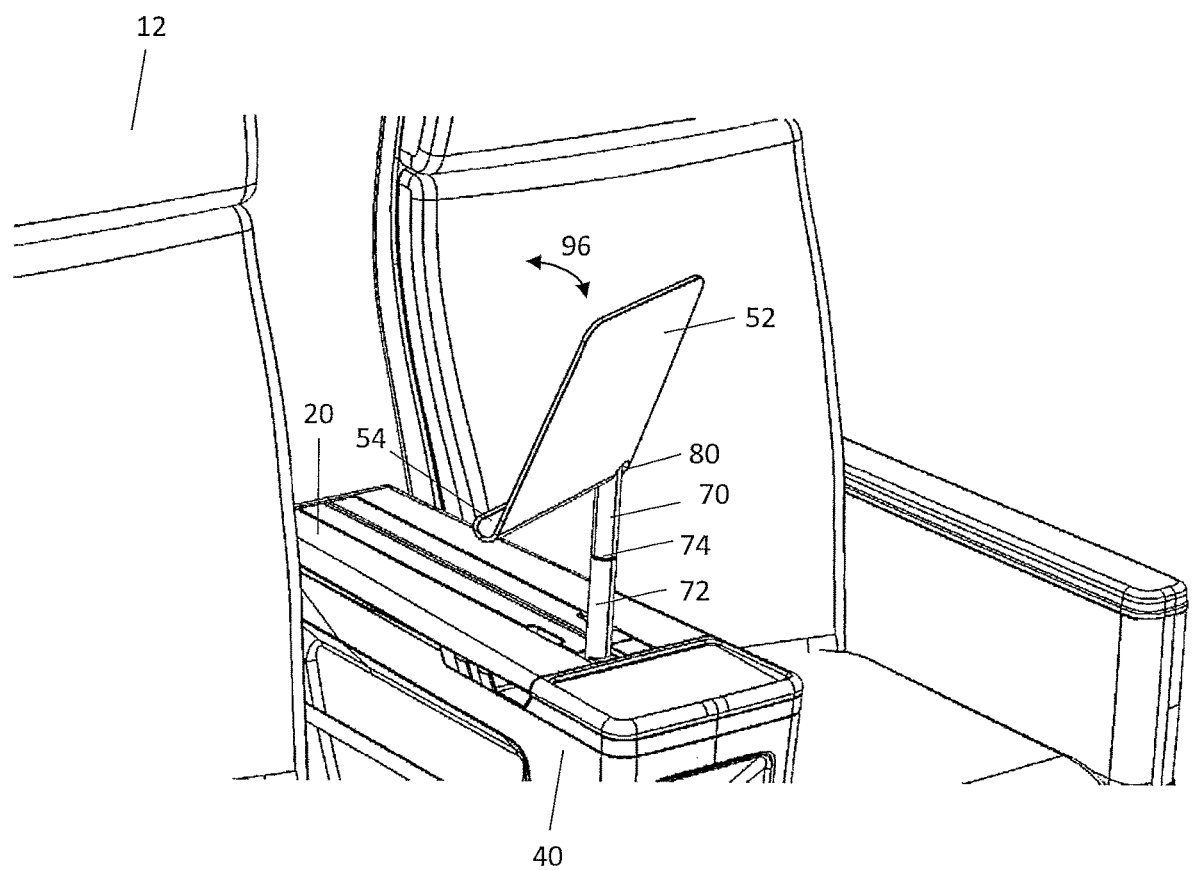
FIG. 7 is an enlarged perspective view of the embodiment shown in FIG. 3 wherein the stowable tray is tilting between a presentation position and a tray position.

FIG. 7 details how stowable tray 50 may transition between a presentation position and a tray position. In this embodiment, tray plate 52 is mounted via a friction hinge 80 onto upper support arm 70. Friction hinge 80 enables tray plate 52 to tilt from a substantially vertical position to a substantially horizontal position along plane 96. A passenger may also adjust the viewing angle while a PED is present on the tray plate in presentation mode by tilting accordingly.

Friction hinge 80 may comprise a knuckle joint that fits within a cut-out 82 on tray plate 52, and may be mounted between one or more points. Preferably, friction hinge 80 should provide enough friction to enable tray plate 52 to hold a PED without unintentionally tilting over, while at the same time, enable a passenger to easily adjust the viewing angle or transition to a tray position. In one embodiment, friction hinge 80 may provide a continuous amount of friction for all available degrees within its range of motion. In another embodiment, the amount of friction may defer depending on the angle that tray plate 52 is tilted. For instance, friction hinge 80 may provide a certain level of resistance to support a PED while in a presentation position, but gradually reduce the amount of friction provided when transitioning to a tray position.

A stop may be further included to prevent tray plate 52 from tilting away beyond the tray position. For example, tray plate 52 may be substantially horizontal at an angle of about 90 degrees between tray plate 52 and support arm 56 while in the tray position. The stop may prohibit tray plate 52 from tilting at an angle less than 90 degrees and prevent cocktail items from sliding off the tray. The stop may be adjustable so that the tolerance can be easily modified and corrected during assembly to ensure that tray plate 52 does not extend beyond a desired angle. Yet other embodiments of the stowable tray may employ a hard stop. In the embodiment shown in FIGS. 6 and 7, the stop comprises the cut-out 82 located on a corner of tray plate 52 with a cap screw to prevent tray plate 52 from tilting beyond the tray position.

In operation, a passenger may remove the stowable tray from its stowable position by opening a door on the center console or armrest, and pivoting the stowable tray into a vertical position. The passenger can then rotate the tray plate for use as either a PED holder in the presentation position, or rotate and tilt the tray plate for use as a cocktail tray in the tray position. A second stowable tray may also be provided to place over the lap of a passenger. The combination of a two stowable trays enables a greater variety of possible uses. For example, a passenger may place the stowable tray in a presentation position to watch a movie on a PED while consuming a meal placed on the second stowable tray. As another example, a passenger may place a drink on the stowable tray in a tray position while the passenger works on a laptop placed on the second stowable tray.

Certain modifications and improvements will occur to those skilled in the art upon a reading of the foregoing description. By way of example, the stowable tray may be installed onto an end bay or an armrest of the passenger seat. Also, the ledge may be variable to accommodate different sizes of PEDs. One example of a variable ledge suitable for use with the stowable tray is provided by U.S. provisional application 62/253,859, hereby incorporated by reference in its entirety. It should be understood that all such modifications and improvements have been deleted herein for the sake of conciseness and readability but are properly within the scope of the following claims.

We Claim:

1. In a seat system for a passenger aircraft wherein the seat system includes at least one passenger seat having a backrest, the improvement comprising a stowable tray, said stowable tray comprising:
   (a) a tray plate having a ledge substantially perpendicular to a flat surface adapted to support one or more items and an anti-skid material covering at least a portion of said tray plate, wherein said tray plate adapted to not tilt beyond the tray position, wherein the tray plate is adjustable, wherein a portion of said tray plate includes a cut-out;
   (b) a support arm attached to said tray plate adapted to move said ledge of said tray between a stowable position and an offset presentation position, wherein said support arm comprises a lower support arm and an upper support arm; and
   (c) a friction hinge attaching said tray plate to said support arm and adapted to adjust said tray plate between said presentation position and a tray position, wherein said friction hinge is installed on top of said upper support arm,
   wherein said ledge of said tray plate and flat surface support a personal electronic device while in said presentation position and said flat surface supports one or more cocktail items while in said tray position.

2. The stowable tray according to claim 1, wherein said lower support arm is pivotally mounted at or adjacent an end opposite of said tray plate.

3. The stowable tray of claim 2, wherein said lower support arm is pivotally mounted onto a center console installed adjacent to said at least one passenger seat.

4. The stowable tray according to claim 1, wherein said upper support arm rotates with respect to said lower support arm along a vertical axis.

5. The stowable tray according to claim 4, wherein said upper support arm rotates said tray plate between said stowable position and said presentation position.

6. The stowable tray according to claim 1, wherein said anti-skid material is applied on said ledge of said tray plate.

7. A seat system for a passenger aircraft, said seat system comprising:
   (a) at least one passenger seat;
   (b) a tray adapted to be stowed and installed onto or adjacent to said at least one passenger seat including
      (i) a tray plate having a ledge substantially perpendicular to a flat surface and an anti-skid material covering at least a portion of said tray plate, and wherein said tray plate adapted to support one or more items, wherein said tray plate adapted to not tilt beyond the tray position;
      (ii) a support arm attached to said tray plate adapted to move said tray plate between a stowed position and a presentation position, wherein said support arm comprises a lower support arm and an upper support arm, wherein the tray plate is adjustable, wherein a portion of said tray plate includes a cut-out; and
      (iii) a friction hinge attaching said tray plate to said support arm and adapted to adjust said tray plate between said presentation position and a tray position, wherein said tray plate is adapted to support a personal electronic device while in said presentation position and adapted to support one or more cocktail items while in said tray position, wherein said friction hinge is installed on top of said upper support arm; and
   (c) a second tray attached to said passenger seat.

8. The seat system according to claim 7, wherein said second tray adapted to be movable between a first position and a second position.

9. The seat system according to claim 8, wherein said second tray is installed on an armrest of said at least one passenger seat.

10. The seat system according to claim 7, wherein said at least one passenger seat includes a base frame, a seat component attached to said base frame and a backrest attached to said base frame adjoining the seat component.

11. The seat system according to claim 10, wherein said backrest further includes a head rest.

12. The seat system according to claim 10, wherein said at least one passenger seat further includes an upholstery package.

13. The seat system according to claim 12, wherein said at least one passenger seat further includes a trim package.

14. The seat system according to claim 7, wherein said lower support arm is pivotally mounted at or adjacent an end opposite of said tray plate.

15. The seat system of claim 14, wherein said lower support arm is pivotally mounted onto a center console installed adjacent to said at least one passenger seat.

16. The seat system according to claim 7, wherein said upper support arm rotates with respect to said lower support arm along a vertical axis.

17. The seat system according to claim 16, wherein said upper support arm rotates said tray plate between said stowable position and said presentation position.

18. The seat system according to claim 7, wherein said anti-skid material is applied on said ledge of said tray plate.

\* \* \* \* \*